(12) United States Patent
Gross et al.

(10) Patent No.: US 6,636,198 B1
(45) Date of Patent: Oct. 21, 2003

(54) INCREMENTAL CONTROLLER FOR GRAPHICAL DISPLAYS

(75) Inventors: Graham L. Gross, Lawrenceville, NJ (US); Arthur W. Gillman, Princeton, NJ (US)

(73) Assignee: Mercer Scientific International Corporation, Trenton, NJ (US)

( * ) Notice: Subject to any disclaimer, the term of this patent is extended or adjusted under 35 U.S.C. 154(b) by 0 days.

(21) Appl. No.: 09/054,895

(22) Filed: Apr. 3, 1998

Related U.S. Application Data
(60) Provisional application No. 60/043,611, filed on Apr. 15, 1997.

(51) Int. Cl.[7] .................................................. G09G 5/08
(52) U.S. Cl. ........................ 345/157; 345/159; 345/160; 345/163
(58) Field of Search .............................. 345/156, 157, 345/158, 159, 160, 161, 162, 163, 145, 146

(56) References Cited

U.S. PATENT DOCUMENTS

| | | | |
|---|---|---|---|
| 4,698,626 A | * 10/1987 | Sato et al. ................... | 340/710 |
| 4,768,029 A | 8/1988 | Burrows ..................... | 340/799 |
| 4,983,786 A | 1/1991 | Stevens David R. et al. . | 178/18 |
| 5,012,231 A | 4/1991 | Felsenstein ................. | 340/709 |
| 5,162,779 A | 11/1992 | Lumelsky et al. .......... | 340/709 |
| 5,182,548 A | 1/1993 | Haeberli ..................... | 340/706 |
| 5,252,952 A | 10/1993 | Frank et al. ................. | 345/157 |
| 5,345,252 A | 9/1994 | Hannah ....................... | 345/162 |
| 5,469,536 A | 11/1995 | Blank .......................... | 395/131 |
| 5,506,946 A | 4/1996 | Bar et al. .................... | 395/131 |
| 5,661,502 A | * 8/1997 | Cheng ......................... | 345/159 |
| 5,704,037 A | 12/1997 | Chen ........................... | 345/184 |
| 5,710,574 A | 1/1998 | Jaaskelainen, Jr. .......... | 345/145 |
| 5,715,334 A | 2/1998 | Peters ......................... | 382/254 |
| 5,771,038 A | * 6/1998 | Wang .......................... | 345/163 |
| 5,910,798 A | * 6/1999 | Kim ............................. | 345/159 |
| 5,914,702 A | * 6/1999 | Derocher et al. ........... | 345/157 |

OTHER PUBLICATIONS

Alan Simpson, "Mastering WordPerfect 6.1 for Windows™," *Sybex Special Edition, 1995*, Selected Pages: 7, 18–19, 32–33, 35–36, 40–45, 68–72, 123, 237–238, 448, 469, 560, 634, 932–933, 1147–1148 and 1161.

* cited by examiner

*Primary Examiner*—Dennis-Doon Chow
(74) *Attorney, Agent, or Firm*—Woodcock Washburn LLP

(57) ABSTRACT

An incremental controller for generating a supplemental positioning signal for use in a display system which includes a graphical positioning device is disclosed. The controller includes an input device, for inputting desired supplemental positioning information. A code generator generates a supplemental positioning signal in response to the supplemental positioning information. A switch is connected to receive the positioning signal and the supplemental positioning signal. The switch outputs either the positioning or supplemental positioning signals in response to receiving a control signal. A controller is connected to the switch for generating the control signal.

17 Claims, 9 Drawing Sheets

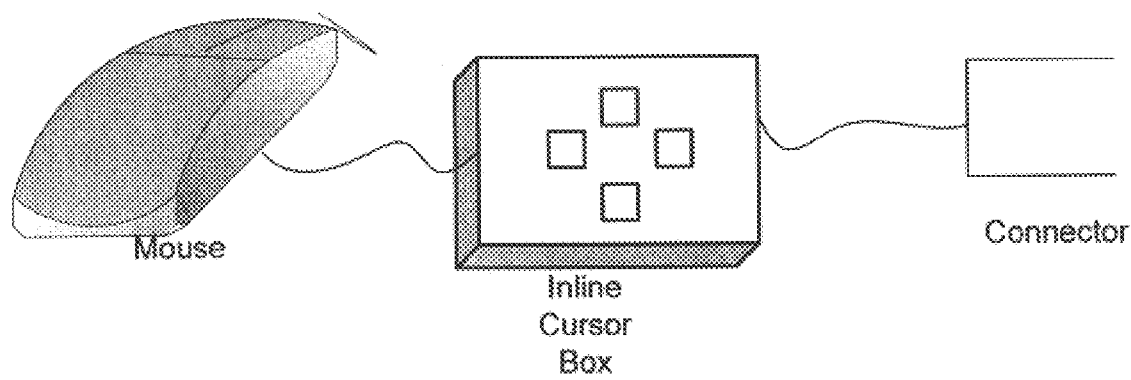
Figure 1-A

INCREMENTAL CONTROLLER FOR GRAPHICAL DISPLAYS

RELATE APPLICATION DATA

The present application claims priority from provisional application Ser. No.60/043,611, filed on Apr. 15, 1997.

FIELD OF THE INVENTION

This invention relates generally to methods and apparatus for controlling the movement of a cursor or other graphical element on a display such as a computer monitor, television, video monitor, general CRT displays, LED displays and various other display devices.

BACKGROUND

Many contemporary systems incorporate a computer monitor or other visual display device. The display device may be used not only to display graphic or photographic images but may also be used to assist in controlling the system. An example of a display used for system control is a displayed cursor used to select a menu box or icon. In many systems the operator may also need to move or otherwise manipulate cursors, or other graphical images, on the display. There are many devices generally available to do this manipulation. A computer mouse, joy stick, graphics tablet, voice commands, keyboards are just a few examples of available devices for cursor manipulation. Generally, use of these devices moves a cursor proportionally to the motion of sensor such as a ball sensor in a mouse, a pointer on a trace pad, or the motion of a lever. Common applications requiring precise control of the motion of the cursor or other graphic are computer controlled machinery, CAD, video measurement, computer animation, control of manufacturing or other types of robots, and many more. One of the drawbacks of the above listed cursor manipulation devices is that their ability to accurately position a graphical element is limited by the accuracy of the positioning device and/or the skill of the operator.

All of the mentioned cursor manipulation devices require some amount of manual dexterity. In some applications, such as computer aided drawing, image enhancement and manipulation, and any many others, it is necessary to move the cursor or graphical image as precisely as possible within very small distances. Such precise movement can be very difficult if not impossible to do. There may be limitations in the accuracy of the control device. Even with the best devices considerable manual dexterity is required. Further, over time even precise devices can become contaminated by dust, lint, etc. which makes it even more difficult to get precise control.

Several approaches have been proposed to overcome this problem. In one, approach, the ratio of controller movement to movement of the cursor is varied, so that larger movements of the control device are required to produce small movements of the cursor or graphic. This method has several limitations. For example, it does not permit the operator to know whether a graphic has been moved the smallest possible increment. Moreover, it is annoying to have to move the mouse a total of several feet (done a few inches at a time) in order to move the cursor across the display screen when this mode is being used.

Another approach, developed to overcome the limitations of the movement-ratio approach above is to expand or zoom the image. This approach also has several disadvantages for many purposes. When a digitized image is expanded by a zoom, the position or characteristics of the zoomed image portion are no longer recognizable relative to the larger image. The characteristics of the zoomed image to the larger image can often be a factor that the operator needs in order to decide how to move the cursor or graphic. Extreme zooming can, in some applications, distort the image to the point that all features of the displayed object are not recognizable. Zooming also proves insufficient when one wants to move from one point in an image to another point that would be on the opposite side of the screen if the image were not zoomed. One has to zoom, perform the graphical or cursor operations, un-zoom, move the cursor across the screen, zoom again, and then perform the desired operation. Depending on image resolution, all movement may occur with the additional problem of not being able to see the relationship of the second set of cursor operations to the first set of cursor operations just performed.

Also the ability to zoom must usually be made an inherent part of the software or hardware of a system. If the system is designed for several different applications, as is a computer, typically fine cursor control will only be available within the zoom function.

Another method of graphical or cursor positioning is to use software to overlay a screen grid on an image, and to point and click the mouse or a cursor grid to move incrementally from grid point to grid point. This solution improves control only for the specific software for which it is written and into which it is incorporated. One drawback of such a method is that grid size is not usually as small as possible because of other considerations and complications in the application program.

Fine control has been provided in some cases by velocity sensitive proportional control, i.e., to make smaller cursor movements in response to low input speeds. Other methods of fine control include hardware and software methods for imitating a slower movement. These methods permit the operator more movement of the control device for a given response. The de-sensitizing of the control should make it easier for the operator to get fine cursor position. Another method of achieving fine control is to use software to divide the display into grids and enable the operator to move the cursor one grid at a time. In this method, the increment of movement must be greater than one pixel. Moreover, the ability to use this feature is limited to software specific operations and is not available to the operator for other applications.

SUMMARY OF THE INVENTION

The above problems are overcome and the advantages of the invention are achieved in methods and apparatus for an incremental controller for generating a supplemental positioning signal for use in a display system which includes a graphical positioning device. The controller includes an input device, for inputting desired supplemental positioning information. A code generator is connected to receive the supplemental positioning information. The code generator generates a supplemental positioning signal in response to the supplemental positioning information. A controller, connected to receive the positioning signal and the supplemental positioning signal, outputs either the positioning or supplemental positioning signals In a preferred embodiment, the controller includes first and second input buffers, wherein the first input buffer stores information generated by the graphical positioning device and the second buffer stores information generated by the code generator. In such an embodiment, a switch controlled by the controller permits the passage of the information stored in either the first or second buffers. It is especially preferred for the switch to be a preemptive mixer.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 1A is a perspective view of a physical embodiment of an incremental controller constructed in accordance with the present invention;

DETAILED DESCRIPTION OF THE INVENTION

Figure 1:
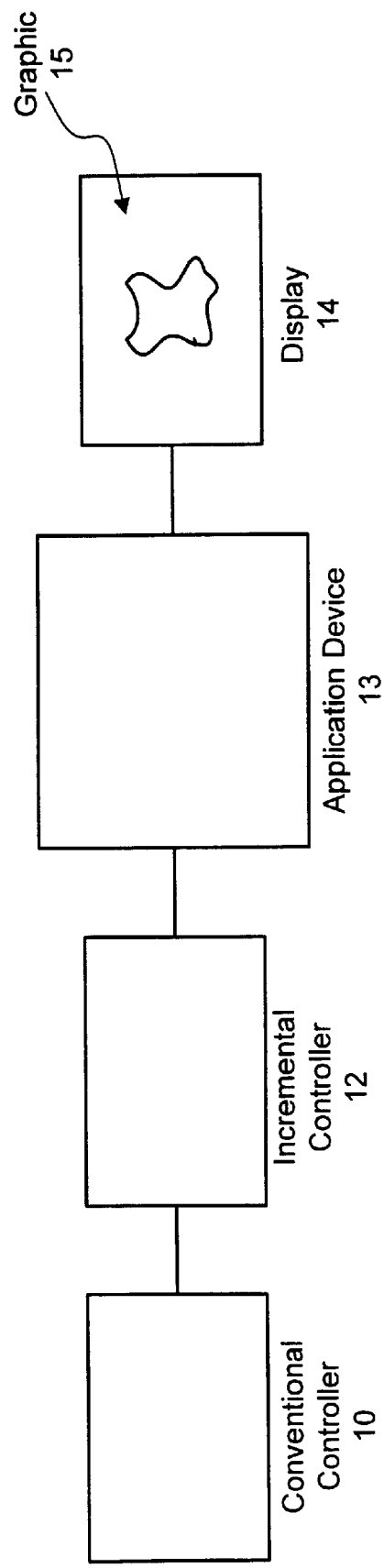
FIG. 1 is a block diagram of a typical family of systems in which the invention may be incorporated or used.

FIG. 1 is a block diagram of the main elements of a system incorporating the present invention. The main elements include a conventional positioning controller 10, a supplemental positioning controller 12 constructed in accordance with the present invention, an application device 13 and a display 14. Application device 13 can be a computer, a machine for controlling manufacturing, a robotics controller or a processor for processing information generated by a sensor, such as a camera, optical sensors of other types, sonic sensors, and many other sensor types. It is preferred for application device 13 to be capable of generating a display signal wherein the resultant display includes a positionable graphic rendering, such as a cursor or pointer and to be capable of modifying the position of the positionable graphic in response to a positioning signal generated by a positioning controller, such as a computer mouse. Conventional positioning controller 10 may be a single type, as shown, or may involve the use of several devices. Examples of conventional positioning controllers include keyboards, a computer mouse, a joy stick and a graphics tablet. It is also within the scope of the present invention for controller 10 to be a sensor system operative in response to voice or other sound commands, or commands from radio signals, or other energies or motion.

Display 14 may include a CRT, an LED or other medium for displaying video images, or it may include any other type of display that produces a visible image. Graphic 15 is a graphical rendering or image generated by application device 13 to appear on display 14. Incremental controller 12 provides special and advantageous control of the positioning of graphic 15, as explained below. It is within the scope of the invention, as will be explained in relation to FIG. 8 below, to package incremental controller 12 in the same container as conventional controller 10 or it may be packaged separately as shown in FIG. 1. It is also within the scope of the invention for incremental controller 12 to be packaged within application device 13. However, for purposes of explanation herein, controllers 10 and 12 are a mouse 16 and a supplemental control box 12, as depicted in FIG. 1A.

Figure 2:
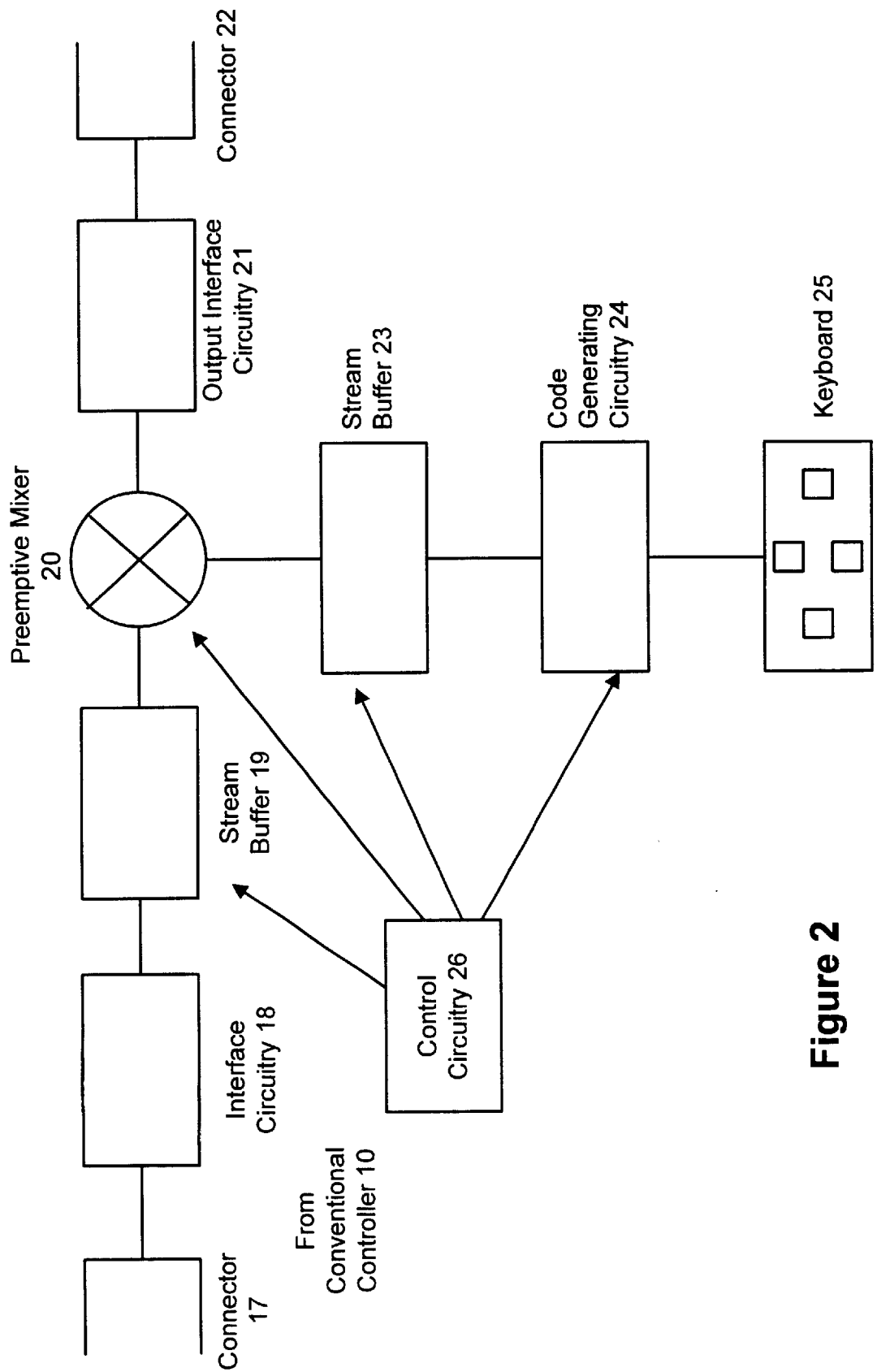
FIG. 2 is a block diagram of the internal operation of one embodiment of an incremental controller constructed in accordance with the present invention.

FIG. 2 is a block diagram showing the primary functional elements of the invention as implemented in control box 12 shown in FIG. 1A. In such an embodiment, incremental controller 12 stands alone and is neither packaged with either the primary controller 10, nor with application device 13. As shown in FIG. 2, incremental controller 12 is connected to primary controller 10 by an appropriate mating connector 17, of a type known in the art. Alternatively, connector 7 may be eliminated by wiring conventional controller 10 directly to the components shown in FIG. 2. It is noted that the various components of FIG. 2 are shown as separate items. Indeed, one may construct an incremental controller in accordance with the invention by using individual components. However, as will be explained in relation to FIG. 3, in the preferred embodiment, many of the components depicted in FIG. 2 are implemented in software in conjunction with a microcontroller.

A serial data stream generated by conventional mouse 10 is input through connector 17. The data is in RS-232C format, (nominally −9 to +9 volts DC) at a data rate of 1200 to 38400 baud. When not sending data, connector 17 is at the 'Mark' voltage, generally from −3 to −15 volts DC.

Input interface 18 converts the incoming serial RS-232C voltage levels to internal parallel data at TTL voltage levels (0 to 5 volts DC) for internal processing. This conversion may be accomplished by using any of the integrated circuits well known in the industry for this purpose. Alternately, voltage level conversion may be accomplished by one circuit, while the serial to parallel conversion may be accomplished by a separate integrated circuit.

Output interface 21 converts internal parallel data at TTL levels (0 to 5 volts DC) to serial data at RS-232 voltage levels (−9 to +9 volts DC) prior to being output by connector 22. It is noted that the goal of the output conversion process is to generate a signal compatible with and preferably identical in characteristics to the input signal applied to connector 17. Again, this conversion may be accomplished by using any of the integrated circuits well known in the industry for this purpose. Indeed, as will be explained in connection with FIG. 5, interfaces 18 and 21 are implemented in a single electronic component. Alternately, the voltage level conversion may be accomplished by one integrated circuit, while the serial to parallel conversion may be accomplished by a separate integrated circuit. In this fashion a signal is generated which appears to application device 13 to have been generated by controller 10.

Referring again to FIG. 2, stream buffer 19 is a first-in-first-out buffer of any known design. When commanded by controller 26, stream buffer 19 will accumulate incoming data for presentation to preemptive mixer 20. Alternatively, when commanded by control circuitry 26, stream buffer 19 will provide all of its accumulated data to preemptive mixer 20. It is known that currently available control devices, such as controller 10, generate positioning signals which include a series or string of position commands where each command includes from 3 to 5 characters. Where such devices are used, it is preferred to store at least two sets of command characters from device 10 in stream buffer 19.

The preemptive mixer 20 acts as a switch or gate permitting one input or another to pass to the output of controller 12. Mixer 20 directs, upon command from controller 26, parallel data signals from either code generator 24 or stream buffer 19 to output interface 21. While data is passing from one source, the other source is prevented from sending data. If discrete electronic components are used to construct incremental controller 12, the function of mixer 20 could be accomplished using tri-state buffers enabled individually by controller 26.

As will be explained in greater detail in connection with FIG. 3, controller 26 is implemented in software operating within a microcontroller. Controller 26 controls the operation of stream buffer 19, code generator 24 and preemptive mixer 20. While controller 26 may be implemented in a single integrated circuit microcomputer, it may also be implemented in a microcomputer with external support integrated circuits. Both forms are within the scope of the invention. As will be seen in connection with FIG. 3, the design of controller 26 follows standard industry practice.

Code generator 24 generates command characters necessary to position graphic 15, in response to input from keyboard 25. The characters generated by generator 24 are in 3 or 5 byte format which is identical to the format used by primary position controller 10. Code generator 24 may be formed from integrated circuits or may be internally included as part of controller 26. Keyboard 25 includes four or more push-button switches which may be connected as either a matrix or as individual switches. The choice of connection style will depend on the implementation selected for code generator 24.

Figure 3:
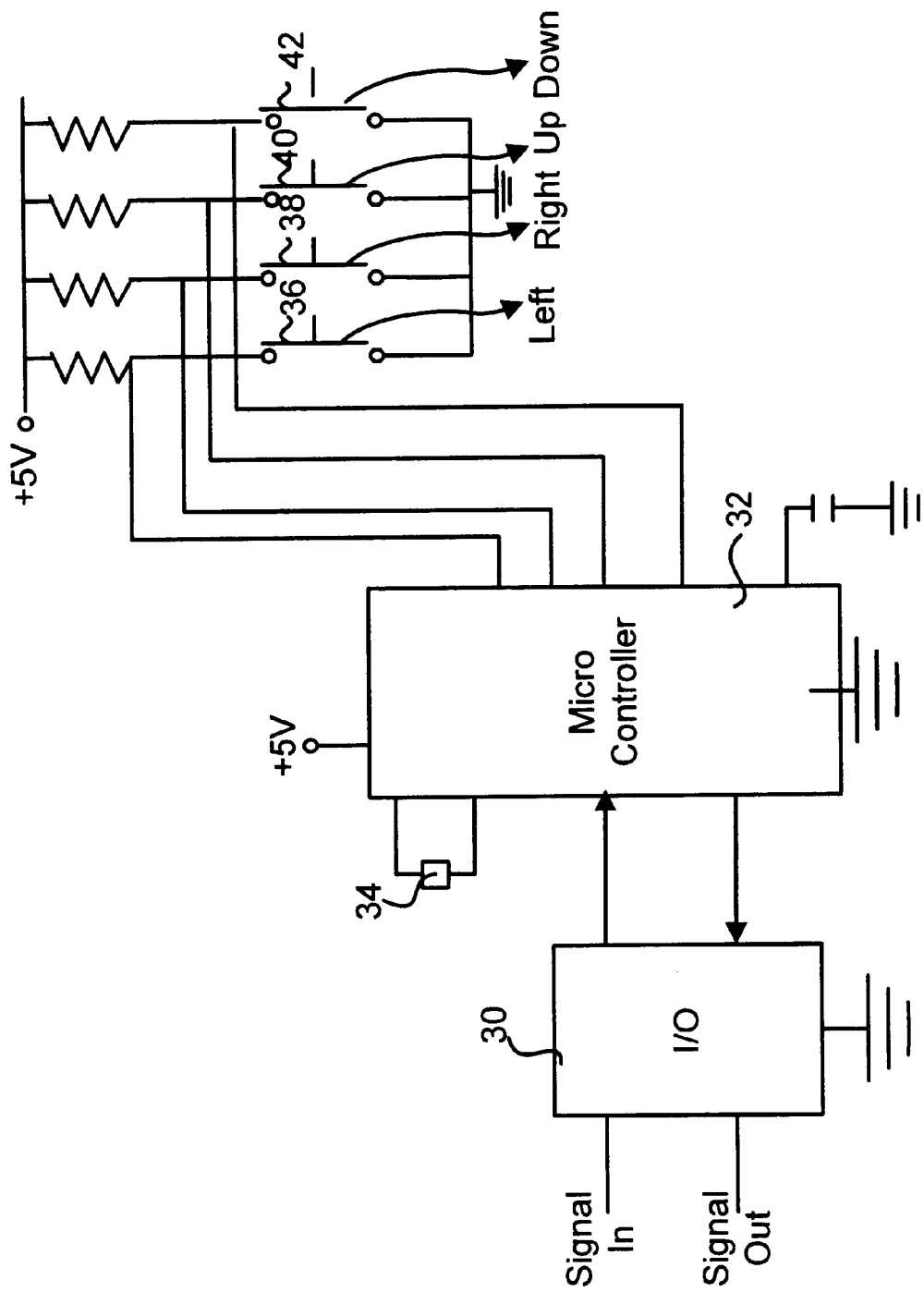
FIG. 3 is a schematic diagram of the controller depicted in FIGS. 1A and 2.

Referring now to FIG. 3, a preferred implementation of the controller depicted in FIG. 2 will be described. As shown in FIG. 3, the signal generated by the primary positioning device/conventional controller 10 is input to I/O interface 30. As explained previously, interface 30 converts the input signal by adjusting voltage levels and transforming serial data to parallel data. In the preferred embodiment, interface 30 is an MC145406 device manufactured and sold by Motorola, Inc. After conversion the input signal is provided to microcontroller 32 for processing in accordance with the operation described in relation to FIG. 2. In the preferred embodiment, microcontroller 32 is an MC68HC70532 microcontroller, manufactured and sold by Motorola, Inc. An oscillator 34 is connected to microcontroller 32 providing the principle clocking signal for use by the microcontroller. A series of button switches 36, 38, 40 and 42 are connected to provide a logic "low" indication to microcontroller 32 when depressed. In this way keyboard 25 (FIG. 2) provides a means for indicating the desire to move graphic 15 either left, right, up or down. The output signal generated by microcontroller 32 is provided to interface 30 which converts the parallel data signal to a serial signal having the same voltage levels as that generated by primary position controller 10.

Figure 4:
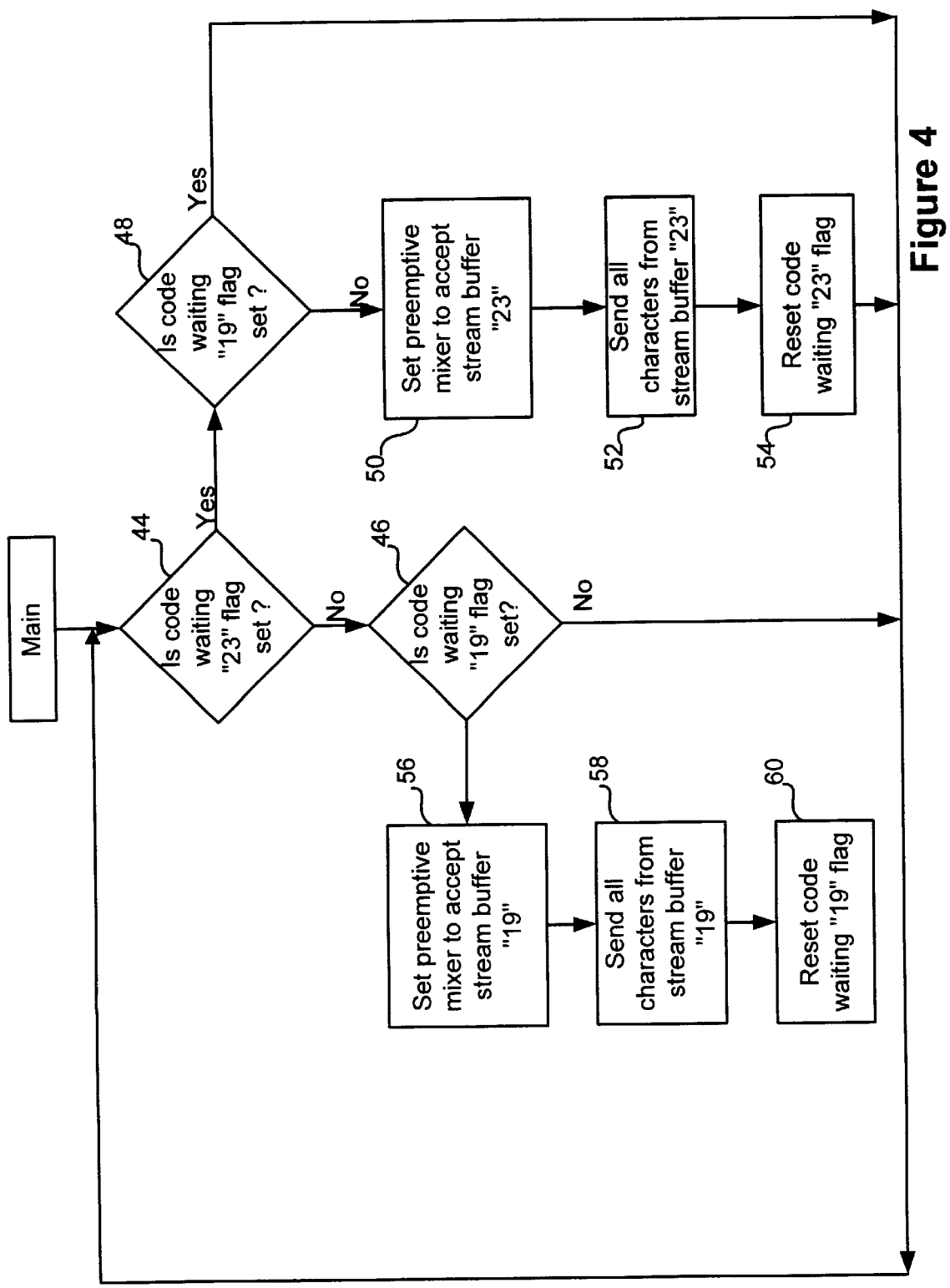
FIG. 4 is flow chart of programming used by the microcontroller depicted in FIG. 3.

Consider now, programming used to operate microcontroller 32 in order to achieve the desired result of the invention, namely to provide a means to move graphic 15 in increments on display 14. It is noted that it is within the scope of the invention for such incremental movements to be as fine as a single pixel at a time. As shown in FIG. 4, the main program of microcontroller 32 determines at 44 whether the code waiting "23" flag has been set. If the code waiting "23" flag has not been set, a determination is made at 46 as to whether the code waiting "19" flag has been set. If it is determined that the code waiting "19" flag has not been set, the programming returns to 44.

If it is determined at 44 that the code waiting "23" flag has been set, a determination is made at 48 whether the code waiting "19" flag is set. If it is determined that the code waiting "19" flag is set, the program returns to 44. If it is determined that the code waiting "19" flag is not set, preemptive mixer 20 is set at 50 to accept the data from stream buffer 23. At 52, mixer 20 is commanded to send the data received from stream buffer 23 to output interface 21. The code waiting "23" flag is then reset at 54.

If it is determined at 46 that the code waiting "19" flag has been set, preemptive mixer 20 is set at 56 to accept data from stream buffer 19. Preemptive mixer 20 is commanded at 58 to send the data received from stream buffer 19 to output interface 21. The code waiting "19" flag is then reset at 60.

Figure 5:
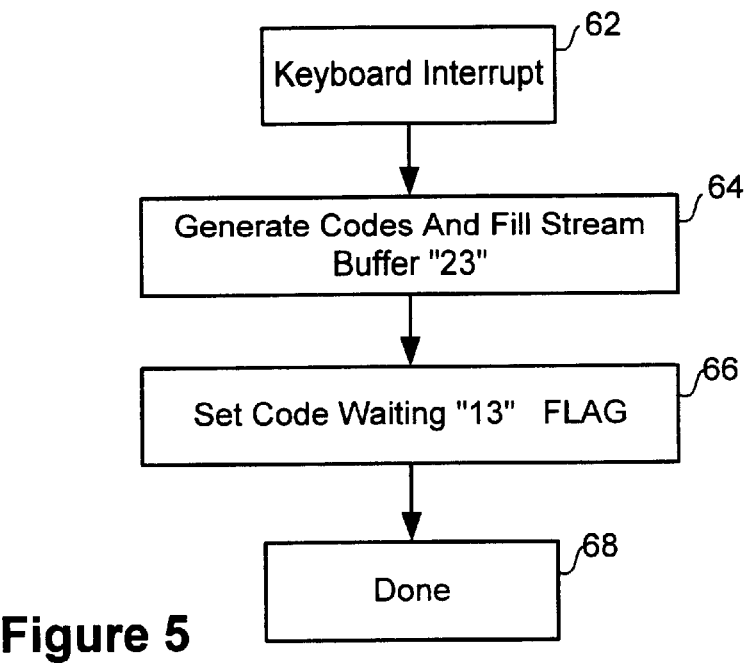
FIG. 5 is flow chart of programming used by the microcontroller depicted in FIG. 3.

Referring now to FIG. 5, the keyboard routine is shown. When it is desired to move graphic 15 one increment, say a single pixel, either up, down, left or right, the corresponding keys on keyboard 25 are depressed. Depressing one of keys 36, 38, 40 or 42 (shown in FIG. 3) results in a keyboard interrupt being generated at 62. Upon such an occurrence, appropriate data is generated at 64 and stream buffer 23 is filled. After filling steam buffer 23 with appropriate data, the code waiting 23 flag is set. It is noted that while movement of graphic 15 in two dimensions is disclosed, it is within the scope of the invention to generate positioning data capable of moving a graphic rendering in more than two dimensions.

Figure 6:
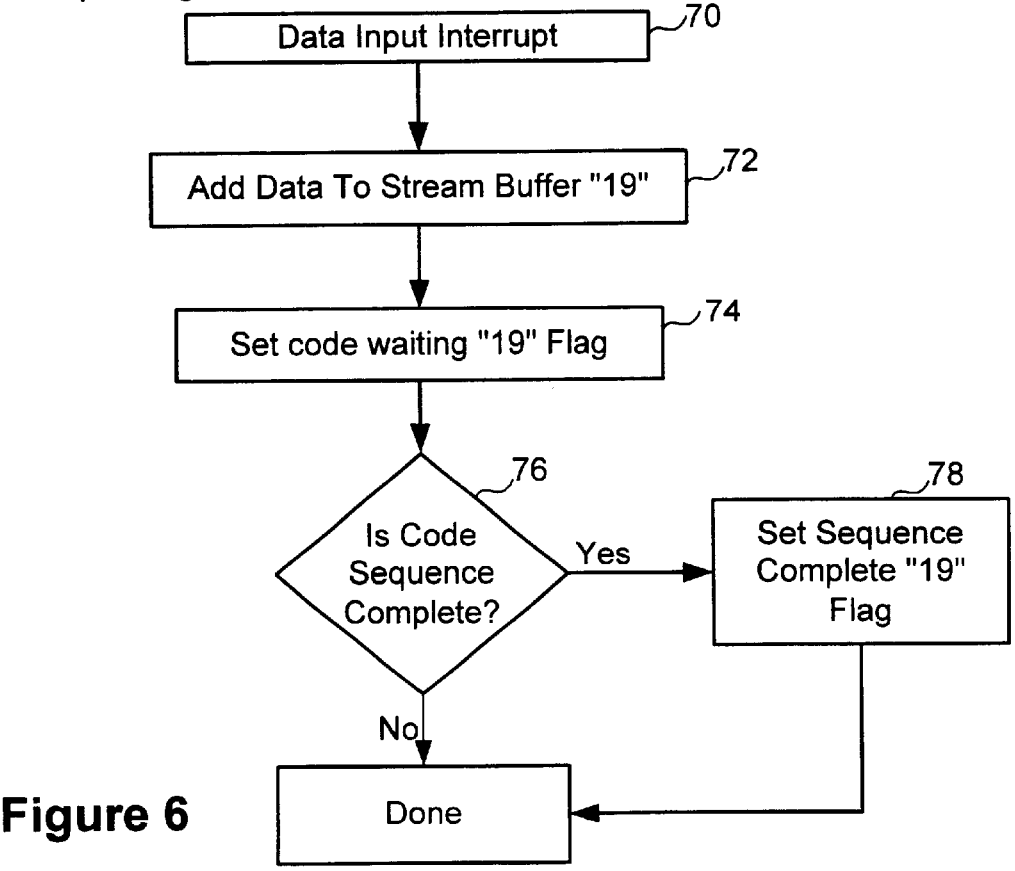
FIG. 6 is flow chart of programming used by the microcontroller depicted in FIG. 3.

Referring now to FIG. 6, programming is disclosed for those situations when data is received from conventional positioning controller 10. When data is received, an interrupt is generated at 70. The received data is added to stream buffer 19 at 72. It will be recalled that the data at this point has passed though interface 18 (FIG. 2), 30 (FIG.3) and is in a form manipulable by microcontroller 32. After data is stored in buffer 19, the code waiting 19 flag is set at 74. A determination is then made at 76 as to whether the code sequence is complete. In other words, a determination is made as to whether controller 10 has completed the generation of positioning commands. If the code sequence is complete, the sequence complete flag 19 is set. The setting of this flag is used by controller 26/microcontroller 32 to permit data generated in response to a keyboard interrupt to be output by the preemptive mixer. If the code sequence is not complete, the routine ends. By failing to set the sequence complete flag 19, the microcontroller knows it is not time to permit data generated in response to a keyboard interrupt to pass to interface 30.

Figure 7:
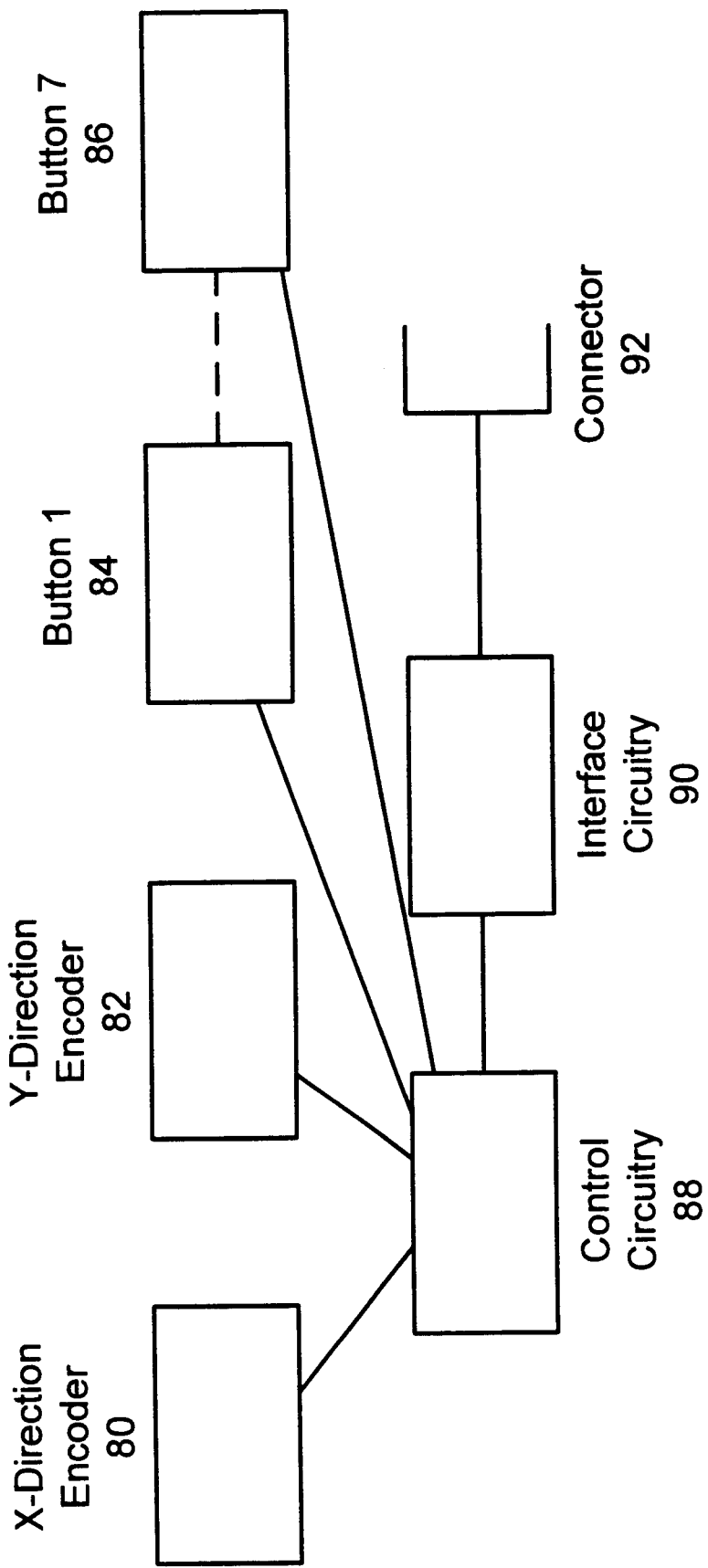
FIG. 7 is a perspective view of another embodiment of an incremental controller constructed in accordance with the present invention.

Referring now to FIG. 7, an alternative X Direction Encoder 80 and Y Direction Encoder 82 are mechanical, optical, or opto-mechanical input devices which translate physical motion into pulses of electrical voltage. In addition, there is direction information encoded in the pulses. This may be done by encoding phase information on two streams of data, as is well known in the industry. The number of pulses per unit of distance traveled in the X or Y direction may be fixed by mechanical means, or may be adjustable by a combination of mechanical means and circuitry.

Buttons 84–86 are push-buttons accessible to the user from the external surface of the device. The push-buttons are normally open, and may be wired in either a matrix format, or individually, depending on the circuitry used in Control Circuitry 88. Control Circuitry 88 is a single chip microcomputer used to a) sense actions of any of buttons 84–86, read data from X direction encoder 80 and Y direction encoder 82, c) generate the output data stream that goes to Interface Circuitry 90. Control Circuitry 88 may comprise one central integrated circuit or may comprise one central integrated circuit with external support integrated circuits, depending on the style of the central integrated circuit. Control Circuitry 88 is internally governed by programming contained in ROM internal to the central control integrated circuit.

Interface Circuitry 90 converts the internal parallel data at TTL, levels (0 to 5 volts DC) to serial data at RS-232 voltage levels (nominally −9 to +9 volts DC). This may be accomplished by a single integrated circuit as is well known in the industry. Alternately, the voltage level conversion may be accomplished by one circuit, while the serial to parallel conversion may be accomplished by a separate integrated circuit. Operation The fundamental function of the invention is to use a single, unambiguous action to move a displayed graphical element precisely one pixel, or some other predetermined number of pixels. There are several ways to implement this function, and the function itself can be varied to meet the requirements of different applications.

In particular, the device allows an operator to easily move a graphical element the smallest distance that can be displayed. Further the graphical element is moved by a single unambiguous action by the operator or other control means. It can be moved by pressing a button, tapping a device, speaking a word, striking a key or through some other discrete event or combination of events such as pressing a button twice or by a signal from another device. An important feature is that the action does not require skill or the ability to control movement manually.

Many systems have the characteristics shown in FIG. 1. A controller device is used to send and receive signals from a system device (such as a general purpose computer, a control device for manufacturing, a computer aided, drawing system, a remote control for robotics and many others). A display, which may be a video monitor, a computer monitor, or other type of display, is connected to the system device. In addition, there may be other elements of the system, such as a video camera, or other source of video, a separate data source device, such as a sensor of some type. When using the system the controller device is used to direct the system device to move a graphical item on the screen. The graphical device is frequently generated by the system device, but may be provided by some other device connected to the system device, or directly to the display. A commonly used graphical device is a cursor.

We describe here one embodiment of the invention in which the system device is a general purpose computer, the controller device is actually two devices—a conventional computer mouse and an Incremental Controller constructed in accordance with the invention. The display is a conventional computer monitor, and the graphical element is a conventional cursor.

The position of a cursor is determined by a position grid of imaginary dots in the horizontal (X) and vertical (Y) plane. The higher the number of dots in each direction, the finer the position of the cursor may be determined. The number of dots in the XY plane is referred to as the resolution of the video. Common resolutions range from 500×500 to 2000×2000. The human operator has no trouble sensing movement of one division at any of these resolutions.

The word "pixel" is in general use to be a contraction of the words "picture element". This refers to a division of a picture into a square or rectangular grid of elements. Each element is assumed to be homogeneous and has certain properties such as color or brightness. A picture is digitized by translating it into an array of pixels. Some information is inevitably lost by this digitization.

The word "pixel" is used herein to refer to the smallest or smallest practical division of position on the video screen. This emphasizes the discrete nature of the positioning circuitry but may apply equally when the positioning circuitry does not use discrete divisions of the screen.

The description of the operation and design of the invention set forth above is made in terms of circuit elements well known in the state of the art. It is noted there are several ways to implement the individual circuit elements; and alternates to the elements are well known to those familiar with the technology and can be used in place of the particular elements shown here.

Referring again to FIG. 1, Incremental Controller 12 is connected in series with a cable from a mouse to a computer. Incremental Controller 2 has buttons shown FIG. 2 and in FIG. 1A that are used to move a cursor in a selected single direction. (Four buttons are shown, however, fewer buttons could be used by combining using combination of button clicks or incorporating other methods such as using another controller or software). An operator pushes one of the buttons or uses other controls, and the cursor is then moved by one increment—a pixel. If a button is held, after a time delay, the invention may optionally be designed to move the cursor another increment.

Incremental Controller 12 (ICD) intercepts signals from the mouse and adds its own signals. It does not interfere with the normal operation of the mouse. As shown on FIG. 2, the mouse is connected to connector 17 and application device 13 is connected to connector 22. Internally, the ICD generates signals from the keyboard in the same format as the signals from the mouse. Standard signals from a mouse encode the incremental motion since the last output, as well as the status of the buttons on the mouse. The ICD will encode a stream of signals that encode a motion of one video grid point in the direction chosen. The application will process the information as if generated by the mouse.

Referring again to FIG. 2, the ICD operation is mediated by controller 26 which controls the operation of the following protocol. The signals from the mouse are first processed by the interface 18 which translates the voltage levels to internally suitable levels. The stream is stored in stream buffer 3 in the case that the ICD is currently transmitting signals from the keyboard. When it is free to, controller 26 will allow the stream from the mouse to pass through to the output interface 21. While passing the control stream from the mouse, other signals that may be created by the code generator 24 are stored temporarily in stream buffer 23 while the mouse stream is allowed to pass. By this preemptive method with buffering, no signals are lost from either the mouse or the keyboard. Since the required speed of response to the keyboard is at human levels, i.e. at most 6 times per second, the circuitry/software is able to respond perfectly. A typical mouse in use today transmits a stream of 5 bytes at a speed of 120 bytes per second. Therefore, when in use, the mouse is transmitting 24 commands per second. The incremental controller 12 may interpose one command and delay the mouse stream by $\frac{1}{24}$sec., which is completely unnoticeable by the operator or the application.

Incremental Controller Incorporated Within a General Purpose Control Device Reference is now made herein to a device that incorporates the incremental control functions described above into a conventional controller such as a joystick or conventional computer mouse. This variant permits an otherwise conventional mouse to be used to control the position of the cursor, or other graphic element to an accuracy of one pixel on the video screen. The normal operation of the mouse is not modified, but buttins may be physically added to allow the operator to put the mouse into incremental motion in which the roller ball is not used, but the push-buttons are used to send commands to the application to move one pixel in any of 4 or more directions. The buttons may be the same buttons in normal use with the mouse, or may be or include additional buttons to the 2 or 3 normal buttons.

Figure 8:
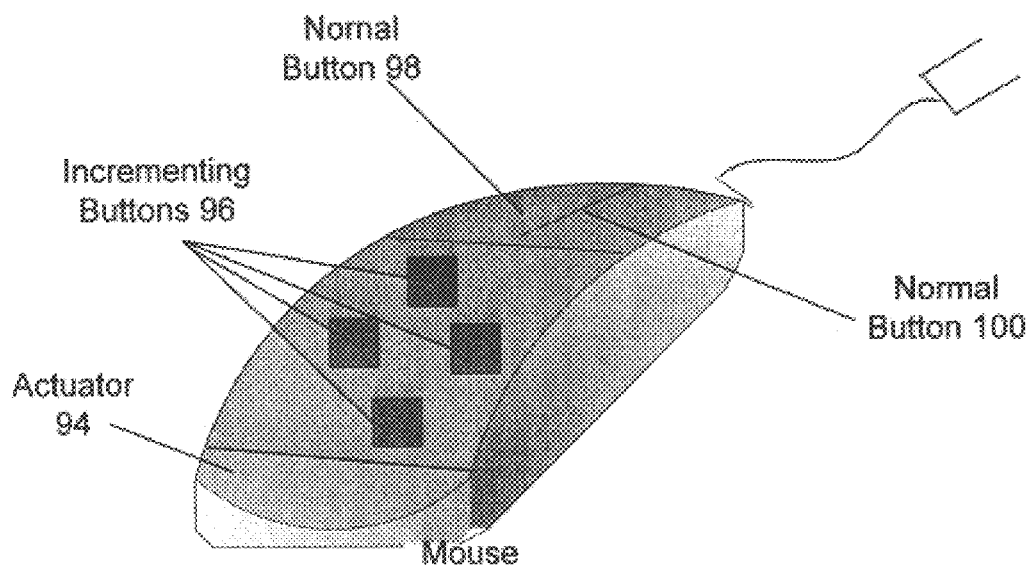
FIG. 8 is a block diagram of the incremental controller depicted in FIG. 7.

As shown in FIG. 8, the mouse with incremental controller installed can be shaped like a standard mouse, with 2 buttons (98,100) for use in normal mouse applications. There are a large number of possible methods of placement and function of buttons on a mouse incorporating incremental control.

In the version illustrated, the operator depresses activator 94, on the rear portion of the mouse body, to activate the incremental mode. While activator 94 is depressed, incrementing buttons, 96 are operable and normal buttons 98, 100 are non-operable. When depressed, the incremental controller buttons send commands to move the cursor by one pixel in a direction corresponding to the button depressed. To revert to normal operation, the operator releases activator 94. A skilled operator can seamlessly switch between normal mode and incremental mode instantly, thus giving the required fine control of the cursor at the pixel level.

FIG. 7 shows greater details of the mouse with incremental control circuitry incorporated. Control circuitry 88 is the heart of the device. It interprets inputs from X Direction Encoder 80, Y Direction Encoder 82, and Buttons 84–86. Control circuitry 88 takes these inputs and formats a control stream to send to interface circuitry 90 which is connected to connector 92 which plugs into the application device. The control stream may be in any of various industry standard formats which are recognized by common applications.

In this example control circuitry 88 is a single chip computer which takes its power from connector 92 through interface 90. Consider now an example of the invention when a conventional controller is used and the invention is incorporated in a device controlling the display is used to achieve incremental control. Software implementations are suitable for various platforms where an input device such as a mouse is used and video grid level control is desired with no change in the hardware. These applications may include computer aided drawing, design, photo-retouching, and any other applications where fine control of cursor position is required. The software is pre-installed as a resident program in the application computer. One or more or more available keys, buttons or other input methods and devices with a single unambiguous action can be dedicated to incremental control. Alternatively no device need be dedicated to incremental control, and instead a means is used to switch an existing control device to an incremental control function by the operator or automatically if such is appropriate for the application.

Other forms of the invention are possible with combinations of hardware and software, depending on the requirements of the application. One possible combination of hardware and software would result in a voice input command that moved the cursor position by one pixel in any direction. This implementation would require hardware for the voice input and software to interpret the command to be an incremental controller command.

Another form would be embedded in an application where the cursor keys on a normal keyboard could be used for cursor motion by one pixel only. This mode would be chosen by the operator by some other means in the application.

There are two general approaches to implementing the invention. In the first approach, the control means are all incorporated into a device or devices that are physically separate from but connected to the display device or the device controlling the display device (e.g. a computer, television, control system for manufacturing, etc. used to control a video monitor).

In the second approach, circuitry and software in the device controlling the display device are used to control the graphical element and a conventional control device such as a mouse or joystick, or any other is used to generate the commands for movement. The implementation of such a software embodiment is depicted in FIG. 9.

Figure 9:
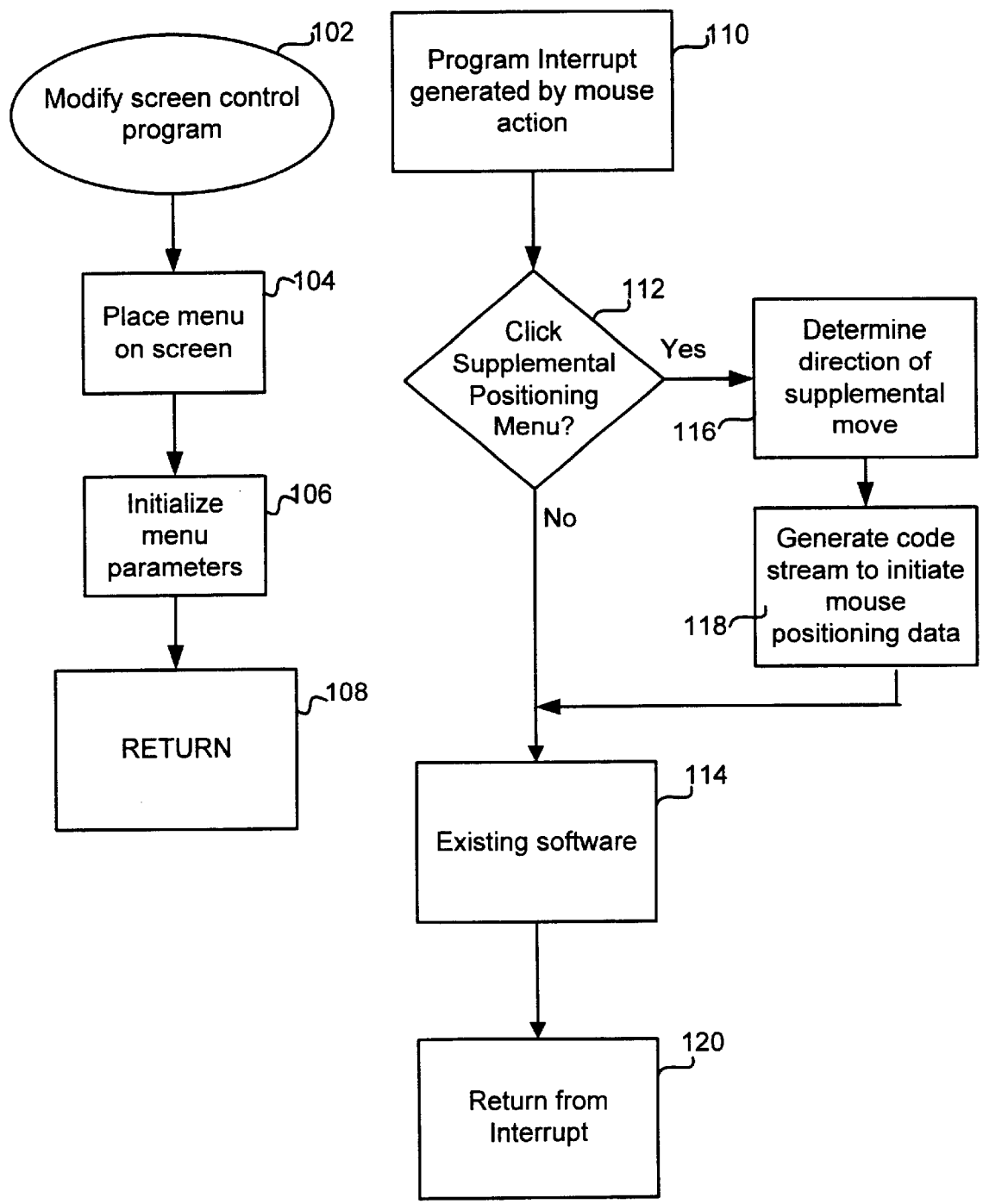
FIG. 9 is a flow chart depicting an alternative embodiment of the invention, in which implementation occurs within the software used to control a display device.

As shown in FIG. 9, the signal generated by an input device such as a mouse, trackball, keyboard, etc., is monitored. A special menu, icon or other graphical rendering, displayed on the display device, is used by the operator to choose functions for moving the cursor, screen pointer or other graphical element a desired increment, such as one pixel, for each input signal.

The menu or on-screen icon is implemented by adding software to the existing screen control software such as that shown by blocks 102 through 108. This software causes a screen menu or icon to be generated at 104. Thereafter, the menu or icon paramaters are initialized at 106 and the software returns at 108 to the display program. Additional software may be desirable to set resolution, pixel movement or other options.

The software shown by blocks 110 through 120 describes how mouse actions are modified to include menu or icon choices to move the cursor once the menu or on-screen icon has been implemented. The input device when operated is assumed to generate an interrupt at 110 to the general software flow. This interrupt is modified to examine whether a menu choice for a supplemental positioning input has been made. Modification is made by determining at 112 whether the supplemental positioning menu, displayed at 104, has been selected. If it is determined at 112 that the supplemental positioning menu has not been selected, for example by placing the mouse cursor onto the menu and clicking the mouse, the program returns to the main program or to that program which was interrupted at 114. If it is determined at 112 that the supplemental positioning menu has been selected, the direction of supplemental movement is determined at 116 and a code stream is generated at 118 to imitate that code which would have been generated by the input device in order to produce the desired incremental movement. The main display software will thereafter interpret the supplemental codes as if it had been generated by the input device. The program then returns from the interrupt at 120.

The graphical device being controlled may be a cursor of any shape, a geometric element such as a line, circle, polygon, or irregular shape, a complex image such as a drawing or photograph, or any other element of an image, or even an entire image that can be displayed on the display device.

There are generally two types of positioning devices: absolute, and relative. An absolute positioning device places the cursor at a position based on the position of the control. An example of this is certain types of drawing tablets. The cursor position is a mirror of the actual position of the control. There is usually a method of zooming to simplify fine control.

A relative positioning device senses motion of the control device or other command and moves the cursor in a similar motion relative to its present position. The ubiquitous mouse is an example of this type of control.

Cursor control when the control device is physically separate from the device controlling the Display. Method using a standard control device and a separate additional controller, both physically separated from the device controlling the display.

This example is described where the control device is a common computer mouse. Any input controller could be used in its place. The mouse is an incremental controller. Signals are sent from the mouse to the application expressing the incremental distance that the mouse has been moved since the last message. The mouse may send its signals by serial or parallel interface. There are many currently accepted protocols for the format of these signals. In general, the signals consist of a stream of bytes, each consisting of 8 its of information. The format of the stream is recognized by the application and decoded to get the information sent by the mouse.

In this approach, the second device is connected between the mouse and a computer, or may be incorporated into the same packaging as and share circuitry with the conventional mouse. Instead of a computer, any other device that is controlling, in part or in whole, the display device can be used. Instead of a mouse, any other type of input device, such as a trackball, joystick and many others may be used. In such an embodiment, the second device is the incremental controller. It is connected via wire or other method, such as infrared or radio signals to the device controlling the display. The Incremental Controller has push-buttons to allow the operator to move the cursor by one increment in any direction. If the incremental controller is packaged with a conventional mouse, it may share conventional push buttons with the mouse or have additional buttons or other types of activators. In either case, in lieu of push-buttons, any other method of effecting a discrete action as discussed above may be used.

Many variations are possible on the basic invention. For example, other mechanical arrangements have been used in special applications. Non-mechanical controls are possible, such as eye-following and voice command. The number of buttons employed on the incremental control device can vary from one to as many as 8 or even more. The choice will depend on the application, economic factors and other conditions. If the number of buttons are few, one or more buttons will have to have multiple purposes that could be selected by a combination of other buttons on the device or by the position of the cursor on the display. In the place of buttons, levers, switches, voice or other audible commands could be used. The graphic can be moved two, three, or some other selected number of pixels at a time.

While the invention has been described and illustrated with reference to specific embodiments, those skilled in the art will recognize that modification and variations may be made without departing from the principles of the invention as described hereinabove.

What is claimed is:

1. An incremental controller for moving a graphic to a desired location in response to an input action or signal, for use in a display system which includes a graphical positioning modality for positioning a graphic on a display monitor in said display system, wherein the positioning modality generates a positioning signal to move the graphic by a variable amount, the variable amount being responsive to an input action, and wherein said display system displays said graphic on said monitor utilizing display increments, said incremental controller comprising:

a two-state input device, for inputting incremental positioning information necessary to modify the position of said graphic provided by said graphical positioning modality by a desired number of said display increments to place said graphic in a desired location anywhere on said monitor, said incremental positioning information to move the graphic by a predefined amount;

a code generator, connected to receive said incremental positioning information from said input device, for generating an incremental positioning signal in response to said incremental positioning information; and a controller, connected to receive said positioning signal and said incremental positioning signal, for outputting either of said positioning or incremental positioning signals, whereby said incremental controller is operative to move said graphic to a precise location, relative to said display increments, on said monitor.

2. The incremental controller of claim 1, wherein said input device comprises means for discrete operator action in relation to said input device.

3. The incremental controller of claim 1, wherein said input device comprises a keypad.

4. The incremental controller of claim 3, wherein said keypad includes keys for indicating a desire to supplement the graphical display signal in up, down, left and right directions.

5. The incremental controller of claim 1, further comprising a first buffer for storage of said positioning signal and a second buffer for storage of said incremental positioning signal.

6. The incremental controller of claim 5, wherein said controller comprises means for controlling the provision of information stored in said first and second buffers as the output of said incremental controller.

7. An incremental controller for moving a graphic to a desired pixel location in response to an input action or signal, for use in a pixel based display system which includes a graphical positioning modality for positioning a graphic on said display system, wherein the positioning modality generates a positioning signal to move the graphic by a variable amount, the variable amount being responsive to an input action, said incremental controller comprising:

two-state input means for inputting supplemental positioning information necessary to modify the position of said graphic provided by said graphical positioning modality to place said graphic in a desired pixel location, said supplemental positioning information to move the graphic by a predefined amount;

code generation means, connected to receive said supplemental positioning information from said input device, for generating a supplemental positioning signal in response to said supplemental positioning information;

switch means, connected to receive said positioning signal and said supplemental positioning signal, for outputting either of said positioning or supplemental positioning signals in response to a control signal; and control means, connected to said switch, for generating said control signal.

8. The incremental controller of claim 7, wherein said control means comprises a microcontroller.

9. A cursor positioning apparatus, comprising:

a switching device having a first input, a second input, and an output, the first input receives coded positioning information to increment a cursor position by a variable amount;

a user input device that receives a user selection to increment the cursor position by a predefined amount; and a code generator having an input and an output, the input of the code generator in communication with the user input device, the output of the code generator in communication with the second input of switching device, the code generator upon receiving a selection from the user input device generates coded positioning information to increment the cursor position by a predefined amount.

10. The cursor positioning apparatus as recited in claim 9, further comprising:

an input port in communication with the first input of the switching device, the input port adapted to mate with a cursor control device.

11. The cursor positioning apparatus as recited in claim 10, wherein the input port is adapted to mate with a mouse that generates coded positioning information to increment the cursor position by a variable amount responsive to mouse motion.

12. The cursor positioning apparatus as recited in claim 9, wherein the user input device comprises a button and wherein the code generator, in response to user selection of the button generates coded positioning information to increment the cursor position by a predefined amount.

13. The cursor positioning apparatus as recited in claim 12, wherein the predefined amount is one pixel.

14. The cursor positioning apparatus as recited in claim 12, wherein the predefined amount is five pixels.

15. The cursor positioning apparatus as recited in claim 9, wherein the user input device comprises a first, second, third, and fourth button and the code generator, in response to user selection of the first button generates coded positioning information to increment the cursor position by a predefined amount in a left direction, in response to user selection of the second button generates coded positioning information to increment the cursor position by a predefined amount in an up direction, in response to user selection of the third button generates coded positioning information to increment the cursor position by a predefined amount in a right direction, in response to user selection of the fourth button generates coded positioning information to increment the cursor position by a predefined amount in a down direction.

16. The cursor positioning apparatus as recited in claim 15, wherein the switching device further comprises a control input that controls whether the first input or the second input communicates with the output, the apparatus further comprising:

a second user input device in communication with the second input of the switching device, and wherein the switching device, in response to a selection of the second user input, communicates positioning information from the second input of the switching device to the output of the switching device and does not communicate positioning information from the first input of the switching device to the output of the switching device.

17. The cursor positioning apparatus as recited in claim 16, further comprising:

a computer mouse input variable positioning device in communication with the first input of the switching device; and a computer mouse housing;

and wherein the first user input device, the second user input device, the switching device, the code generator, and the computer mouse input variable positioning device are housed in the computer mouse housing.

* * * * *